(12) United States Patent
Zeng et al.

(10) Patent No.: US 11,735,111 B1
(45) Date of Patent: Aug. 22, 2023

(54) DRIVING CIRCUIT, DRIVING METHOD AND DISPLAY PANEL

(71) Applicants: HUIZHOU CHINA STAR OPTOELECTRONICS DISPLAY CO., LTD., Guangdong (CN); Shenzhen China Star Optoelectronics Semiconductor Display Technology Co., Ltd., Guangdong (CN)

(72) Inventors: Weijing Zeng, Guangdong (CN); Chenglei Nie, Guangdong (CN)

(73) Assignees: HUIZHOU CHINA STAR OPTOELECTRONICS DISPLAY CO., LTD., Guangdong (CN); SHENZHEN CHINA STAR OPTOELECTRONICS SEMICONDUCTOR DISPLAY TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/823,613

(22) Filed: Aug. 31, 2022

(30) Foreign Application Priority Data

Jul. 15, 2022 (CN) .......................... 202210836607.8

(51) Int. Cl.
  *G09G 3/3233* (2016.01)

(52) U.S. Cl.
  CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01); *G09G 2330/021* (2013.01)

(58) Field of Classification Search
  None
  See application file for complete search history.

(56) References Cited

U.S. PATENT DOCUMENTS

| | | | | |
|---|---|---|---|---|
| 9,047,813 B2* | 6/2015 | Minami | ............... | G09G 3/3225 |
| 11,417,273 B2* | 8/2022 | Toyotaka | .................. | G09F 9/30 |
| 2015/0115259 A1* | 4/2015 | Yamazaki | ........... | H01L 27/1225 |
| | | | | 257/43 |
| 2015/0171156 A1* | 6/2015 | Miyake | ............... | H01L 27/1225 |
| | | | | 257/43 |
| 2015/0187276 A1* | 7/2015 | Shim | .................... | G09G 3/3291 |
| | | | | 345/77 |
| 2016/0042694 A1* | 2/2016 | Lim | ..................... | G09G 3/3233 |
| | | | | 345/78 |
| 2016/0329392 A1* | 11/2016 | Miyake | ............... | H01L 27/1255 |

(Continued)

*Primary Examiner* — Dorothy Harris

(57) ABSTRACT

Embodiments of the present disclosure are directed to a driving circuit, a driving method, and a display panel. The driving circuit includes a driving transistor, a writing module, a compensation module, a light-emitting control module and a light-emitting device. The driving transistor has a first gate connected to a first node, a second gate connected to a second node, a source connected to a first power supply terminal, and a drain connected to the third node. The writing module is connected to the first node and the third node. The compensation module is connected to the first node, the second node and the third node. The light-emitting control module is connected to the third node and the fourth node. An anode of the light-emitting device is connected to the fourth node, and a cathode of the light-emitting device is connected to the second power supply terminal.

16 Claims, 5 Drawing Sheets

(56) References Cited

U.S. PATENT DOCUMENTS

| 2018/0190194 A1* | 7/2018 | Zhu | H01L 27/12 |
| 2018/0268760 A1* | 9/2018 | Chen | G09G 3/3266 |
| 2020/0135091 A1* | 4/2020 | Kim | G09G 3/32 |

* cited by examiner

DRIVING CIRCUIT, DRIVING METHOD AND DISPLAY PANEL

CROSS REFERENCE TO RELATED APPLICATION

This application claims the priority of Chinese Patent Application No. 202210836607.8, entitled "Driving Circuit, Driving Method and Display Panel", filed on Jul. 15, 2022, the disclosure of which is incorporated herein by reference in its entirety.

FIELD OF INVENTION

The present disclosure relates to the field of display technology, and more particularly, to a driving circuit, a driving method and a display panel.

BACKGROUND

Organic light-emitting diodes (OLEDs) having the characteristics of self-illumination, high brightness, wide viewing angle, high contrast, flexibility, low energy consumption, etc., are concerned, and are used as a new generation of displays. OLED displays gradually replace traditional liquid crystal displays and are widely used as mobile phone screens, computer monitors, full-color televisions. Large-size OLED TVs are currently the goal pursued by major panel manufacturers.

Each pixel of the organic light emitting diode display includes a driving transistor and at least one switching transistor. The driving transistor is used to control the current of the organic light emitting diode, and the switching transistor is used to drive the gate-source voltage of the driving transistor. The pixel brightness is proportional to the driving current. In the organic light emitting diode display, the driving transistor is subjected to different stress due to process differences. The gate voltage of the driving transistor are different over time, resulting in differences in the threshold voltages of the driving transistors in the panel. Since the pixel brightness is proportional to the driving current, the difference in the threshold voltage of the driving transistor will also lead to the difference in pixel brightness, resulting in the problem of uneven brightness of the display panel.

Therefore, a light-emitting driving circuit that can realize the compensation of the threshold voltage of the driving transistor to improve the uniformity of the brightness of the display panel is required.

SUMMARY

The purpose of the embodiments of the present disclosure is to provide a driving circuit, a driving method and a display panel, which can realize the compensation of the threshold voltage of the driving transistor and improve the uniformity of the brightness of the display panel.

An embodiment of the present disclosure is directed to a driving circuit. The driving circuit includes a driving transistor, a writing module, a compensation module, a light-emitting control module, and a light-emitting device. The driving transistor includes a first gate electrically connected to a first node, a second gate electrically connected to a second node, a source electrically connected to a first power supply terminal, and a drain electrically connected to a third node. The writing module is fed with a data signal, a first control signal and a first scan signal, and is electrically connected to the first node and the third node. The writing module is configured to transmit the data signal to the first node in response to the first scan signal, and configured to transmit the first control signal to the third node in response to the first scan signal. The compensation module is fed with the second control signal and the second scan signal, and is electrically connected to the first node, the second node and the third node. The compensation module is configured to reset the first node, the third node and the second node in response to the second control signal and the second scan signal, and configured to compensate a threshold voltage of the driving transistor in response to the second control signal and the second scan signal. The light-emitting control module is fed with the second scan signal, and is electrically connected to the third node and the fourth node. The light-emitting control module is configured to control the third node and the fourth node to be turned on or off in response to the second scan signal. The light-emitting device includes an anode electrically connected to the fourth node, and a cathode electrically connected to the second power supply terminal.

Optionally, in some embodiments of the present disclosure, the writing module includes a first transistor and a second transistor. The first transistor includes a gate fed with the first scan signal, a source fed with the data signal, and a drain electrically connected to the first node. The second transistor includes a gate fed with the first scan signal, a source fed with the first control signal, and a drain electrically connected to the third node.

Optionally, in some embodiments of the present disclosure, the compensation module comprises a third transistor, a fourth transistor, a first capacitor, and a second capacitor. The third transistor includes a gate fed with the second scan signal, a source electrically connected to the first node, and a drain electrically connected to the third node. The fourth transistor includes a gate fed with the second scan signal, a source fed with the second control signal, and a drain electrically connected to the second node. The first capacitor is connected between the first node and the third node. The second capacitor is connected between the second node and to the third node.

Optionally, in some embodiments of the present disclosure, the lighting control module comprises a fifth transistor that includes a gate fed with the second scan signal, a source electrically connected to the third node, and a drain electrically connected to the fourth node.

Optionally, in some embodiments of the present disclosure, the driving transistor, the first transistor, the second transistor, the third transistor, and the fourth transistor are N-type transistors, and the fifth transistor is a P-type transistor.

Optionally, in some embodiments of the present disclosure, the lighting control module further comprises an inverter that includes an input terminal fed with the second scan signal, and an output terminal electrically connected to the gate of the fifth transistor.

Optionally, in some embodiments of the present disclosure, the driving transistor, the first transistor, the second transistor, and the third transistor, the fourth transistor and the fifth transistor are transistors of the same type.

Another embodiment of the present disclosure is directed to a driving method for driving the above-mentioned driving circuit. The driving circuit includes a light-emitting device, a driving transistor, a first transistor, a second transistor, a third transistor, a fourth transistor, a fifth transistor, a first capacitor and a second capacitor. The light-emitting device is connected to a light circuit coupled to a first power supply terminal and a second power supply terminal. The driving transistor includes a first gate electrically connected to a first node, a second gate electrically connected to a second node, a source electrically connected to the first power supply terminal, and a drain electrically connected to a third node. The first transistor includes a gate fed with a first scan signal, a source fed with a data signal, and a drain electrically connected to the first node. The second transistor includes a gate fed with a first scan signal, a source fed with a first control signal, and a drain electrically connected to the third node. The third transistor includes a gate fed with a second scan signal, a source electrically connected to the first node, and a drain electrically connected to the third node. The fourth transistor includes a gate fed with the second scan signal, a source fed with a second control signal, and a drain electrically connected to the second node. The fifth transistor includes a gate fed with the second scan signal, a source electrically connected to the third node, and a drain electrically connected to a fourth node. The first capacitor is connected between the first node and the third node. The second capacitor is connected between the second node and to the third node. The driving method includes: during a reset stage that the first transistor and the second transistor are turned on in response to the first scan signal, the fifth transistor is turned on in response to the second scan signal, the third transistor and the fourth transistor are turned on in response to the second scan signal, and the fifth transistor is turned off in response to the second scan signal, transmitting the data signal to the first node, outputting the first control signal to the third node, outputting the second control signal to the second node, and keeping potentials on the first node and the third node to be the same; during a threshold compensation stage that the third transistor and the fourth transistor are turned on in response to the second scan signal, the first transistor and the second transistor are turned off in response to the first scan signal, the fifth transistor is turned off in response to the second scan signal, keeping potentials on the first node and the third node to be the same, charging the third node through the first power supply terminal until a voltage difference between the second node and the third node is equal to a threshold voltage of the driving transistor; during a writing stage that the first transistor and the second transistor are turned on in response to the first scan signal, the fifth transistor is turned on in response to the second scan signal, outputting the data signal to the first node, and outputting the first control signal to the third node; and during a light-emitting stage, emitting light by the light-emitting device.

Optionally, in some embodiments of the present disclosure, the reset stage comprises a first reset stage and a second reset stage. During the first reset phase that the first transistor and the second transistor are turned on in response to the first scan signal, the fifth transistor is turned on in response to the second scan signal, and the third transistor and the fourth transistor are turned off in response to the second scan signal, transmitting the data signal to the first node, outputting the first control signal to the third node, and resetting the light-emitting device. During the second reset phase that the third transistor and the fourth transistor are turned on in response to the second scan signal, the fifth transistor is turned off in response to the second scan signal, and the first transistor and the second transistor are turned on in response to the first scan signal, outputting the second control signal to the second node, keeping potentials on the first node and the third node to be the same, and outputting the first control signal to the third node.

Optionally, in some embodiments of the present disclosure, the reset phase includes a first reset phase and a second reset phase. During the first reset phase that the first transistor and the second transistor are turned on in response to the first scan signal, the fifth transistor is turned on in response to the second scan signal, and the third transistor and the fourth transistor are turned off in response to the second scan signal, transmitting the data signal to the first node, outputting the first control signal to the third node, and resetting the light-emitting device. During the second reset phase that the third transistor and the fourth transistor are turned on in response to the second scan signal, the fifth transistor is turned off in response to the second scan signal, and the first transistor and the second transistor are turned on in response to the first scan signal, outputting the second control signal to the second node, keeping potentials on the first node and the third node to be the same, and outputting the first control signal to the third node.

On the other hand, another embodiment of the present disclosure is directed to a display panel which includes a plurality of pixel units arranged in an array, and each of the pixel units includes the above-mentioned driving circuit.

According to the embodiments of the present disclosure, the driving circuit, the driving method, and the display panel are provided. The driving circuit include a driving transistor, a writing module, a compensation module, a light-emitting control module, and a light-emitting device. The driving circuit compensates the threshold voltage of the driving transistor through the compensation module, and resets the first node, the second node and the third node, prevent the threshold voltage of the driving transistor from affecting the brightness of the light-emitting device, thereby improving the uniformity of the display brightness of the display panel. At the same time, it is beneficial to reduce the use of scan signal lines and improve the resolution of the display panel.

BRIEF DESCRIPTION OF DRAWINGS

In order to illustrate the technical solutions in the embodiments of the present disclosure more clearly, the following briefly introduces the drawings that are used in the description of the embodiments. Obviously, the drawings in the following description are only some embodiments of the present disclosure. For those skilled in the art, other drawings can also be obtained from these drawings without creative effort.

DETAILED DESCRIPTION OF EMBODIMENTS

Figure 1:
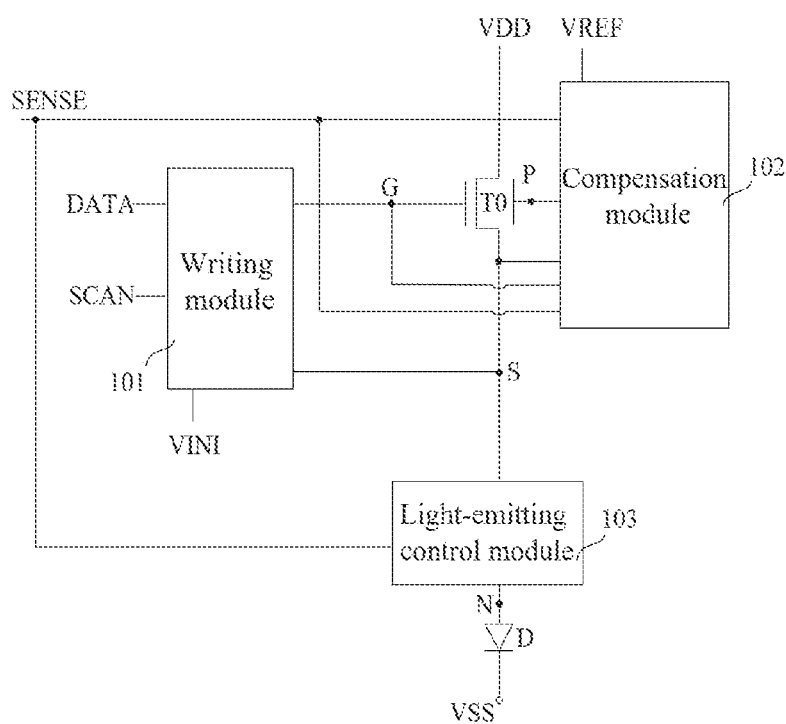
FIG. 1 is a block diagram of a driving circuit according to an embodiment of the present disclosure.

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those skilled in the art without creative work fall within the protection scope of the present disclosure.

The transistors used in all the embodiments of the present disclosure may be thin-film transistor or field effect transistors or other devices with the same characteristics, because the source and drain of the transistors used herein are symmetrical, so their source and drain are interchangeable. In the embodiments of the present disclosure, in order to distinguish the two electrodes of the transistor except the gate, one electrode is called the source, and the other electrode is called the drain. According to the form in the drawing, the middle end of the switching transistor indicates to a gate, the signal input end indicates to the source, and the output end indicates to the drain. In addition, the transistors used in the embodiments of the present disclosure are N-type transistors and P-type transistors. The N-type transistor is turned on when the gate is at a high potential, and the N-type transistor is turned off when the gate is at a low potential. The P-type transistor is turned on when the gate is at a low potential, and the P-type transistor is turned off when the gate is at a high potential. In the embodiment of the present disclosure, the light emitting device D may be a micro light emitting diode (micro-LED) or a mini light emitting diode (mini-LED).

Please refer to FIG. 1. FIG. 1 is a block diagram of a driving circuit according to an embodiment of the present disclosure. As illustrated in FIG. 1, the driving circuit includes a light-emitting device D, a driving transistor T0, a writing module 101, a compensation module 102 and a light-emitting control module 103. It should be noted that the light-emitting device D may be a mini light-emitting diode, a micro-light-emitting diode or an organic light-emitting diode.

The first gate of the driving transistor T0 is electrically connected to the first node G, and the second gate of the driving transistor T0 is electrically connected to the second node P. The source of the driving transistor T0 is electrically connected to the first power supply terminal VDD, and the drain of the driving transistor T0 is electrically connected to the third node S. The writing module 101 is fed with the data signal DATA, the first control signal VINI and the first scan signal SCAN, and is electrically connected to the first node G and the third node S. The compensation module 102 is fed with the second control signal VREF and the second scan signal SENSE, and is electrically connected to the first node G, the second node P and the third node S. The lighting control module 103 is fed with the second scan signal SENSE, and is electrically connected to the third node S and the fourth node N. An anode of the light-emitting device D is electrically connected to the fourth node N, and a cathode of the light-emitting device D is electrically connected to the second power supply terminal VSS. Specifically, the first power supply terminal VDD and the second power supply terminal VSS are both direct current (DC) voltage sources.

Specifically, the driving transistor T0 is used to control the current flowing through the driving circuit. The writing module 101 is configured to transmit the data signal DATA to the first node G in response to the first scan signal SCAN. The writing module 101 is further configured to transmit the first control signal VINI to the third node S in response to the first scan signal SCAN. The compensation module 102 is used for resetting the first node G and the terminal of the first control signal VINI in response to the second control signal VREF and the second scan signal SENSE. The compensation module 102 is also used for compensating the threshold voltage of the driving transistor T0 in response to the second control signal VREF and the first control signal VINI. The light-emitting control module 103 is configured to control the connection or disconnection between the third node S and the fourth node N based on the second scan signal SENSE.

The potential of the data signal is between 0 volts to 10 volts. The potential of the first scan signal is between −10 volts to 20 volts. The potential of the second scan signal is between −10 volts to 20 volts. The potential of the first power supply terminal is between 15 volts to 20 volts, the potential of the first control signal is between 1 volt and 2 volts. Preferably, the potential of the first control signal is 1.5 volts. The potential of the second control signal ranges from 5 volts to 10 volts. Preferably, the potential of the second control signal is 6 volts. The specific potential value can be adjusted by those skilled in the art as required, which is not limited in the present disclosure.

In the driving circuit according to the embodiments of the present disclosure, the compensation module 102 can compensate the threshold voltage of the driving transistor T0, and reset voltage applied on the first node G, the second node P, and the third node S, so as to prevent the threshold voltage of the driving transistor T0 from affecting the brightness of the light-emitting device D, thereby improving the uniformity of the display brightness of the display panel. At the same time, it is beneficial to reduce the use of scan signal lines and improve the resolution of the display panel.

Figure 2:
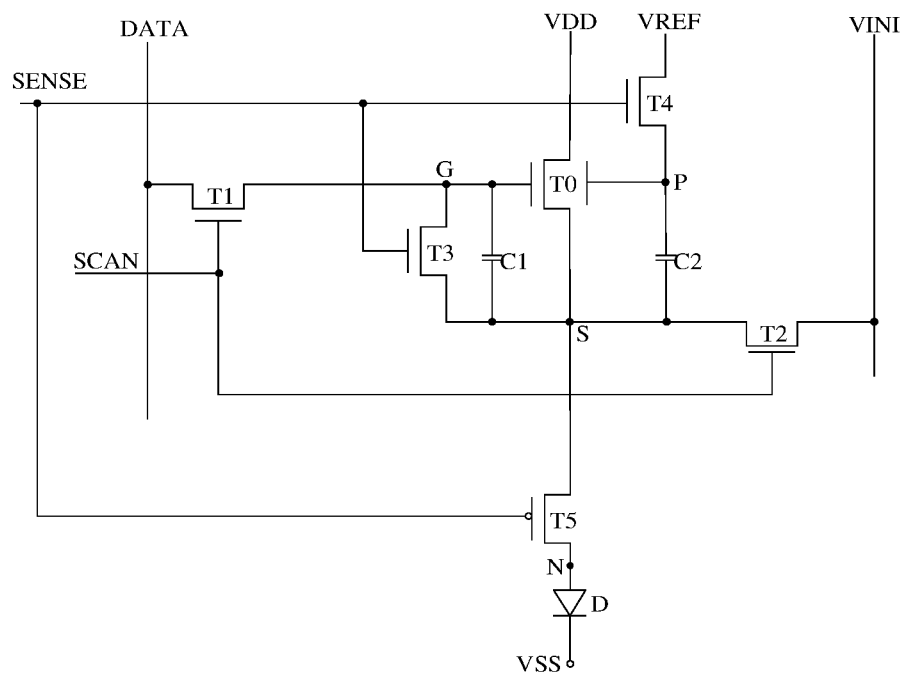
FIG. 2 is a circuit diagram of the driving circuit according to a first embodiment of the present disclosure.

Please refer to FIG. 2 and FIG. 1. FIG. 2 is a circuit diagram of the driving circuit according to a first embodiment of the present disclosure. As illustrated in FIG. 1 and FIG. 2, the driving circuit includes a driving transistor T0, a writing module 101, a compensation module 102, a lighting control module 103, a lighting control module 103, and a light-emitting device D. The writing module 101 includes a first transistor T1 and a second transistor T2. The compensation module 102 includes a third transistor T3, a fourth transistor T4, a first capacitor C1 and a second capacitor C2. The lighting control module 103 includes a fifth transistor T5.

The driving transistor T0 is used to control the current flowing through the driving circuit. The first gate of the driving transistor T0 is electrically connected to the first node G, the second gate of the driving transistor T0 is electrically connected to the second node P, and the source of the driving transistor T0 is electrically connected to the first power supply terminal VDD, the drain of the driving transistor T0 is electrically connected to the third node S.

The gate of the first transistor T1 is fed with the first scan signal SCAN. The source of the first transistor T1 is fed with the data signal DATA, and the drain of the first transistor T1 is connected to the first node G. The gate of the second transistor T2 is fed with the first scan signal SCAN, the source of the second transistor T2 is fed with the first control signal VINI, and the drain of the second transistor T2 is connected to the third node S.

The gate of the third transistor T3 is fed with the second scan signal SENSE. The source of the third transistor T3 is electrically connected to the first node G, and the drain is electrically connected to the third node S. The gate of the fourth transistor T4 is fed with the second scan signal SENSE. The source of the fourth transistor T4 is fed with the second control signal VREF, and the drain of the fourth transistor T4 is connected to the second node P. The first capacitor C1 is electrically connected between the first node G, and the third node S. The second capacitor C2 is electrically connected between the second node P and the third node S.

The gate of the fifth transistor T5 is fed with the second scan signal SENSE. The source of the fifth transistor T5 is electrically connected to the third node S, and the drain is electrically connected to the fourth node N.

The anode of the light-emitting device D is electrically connected to the fourth node N, and the cathode of the light-emitting device D is electrically connected to the second power supply terminal VSS.

It should be noted that both the first power supply signal and the second power supply signal are used to output a preset voltage value. In addition, in the embodiment of the present disclosure, the potential of the first power supply signal is greater than the potential of the second power supply signal. Specifically, the potential of the second power supply signal may be but not limited to the potential of the ground terminal.

It should be noted that the driving transistor T0, the first transistor T1, the second transistor T2, the third transistor T3, the fourth transistor T4 and the fifth transistor T5 may be low temperature polysilicon thin-film transistors, oxide semiconductor thin-film transistors, or amorphous silicon thin-film transistors. Preferably, the driving transistor T0, the first transistor T1, the second transistor T2, the third transistor T3, the fourth transistor T4, and the fifth transistor T5 are all low temperature polysilicon thin-film transistors.

In the embodiment of the present disclosure, the driving transistor T0, the first transistor T1, the second transistor T2, the third transistor T3 and the fourth transistor T4 are N-type transistors, and the fifth transistor T5 are P-type transistors.

Figure 4:
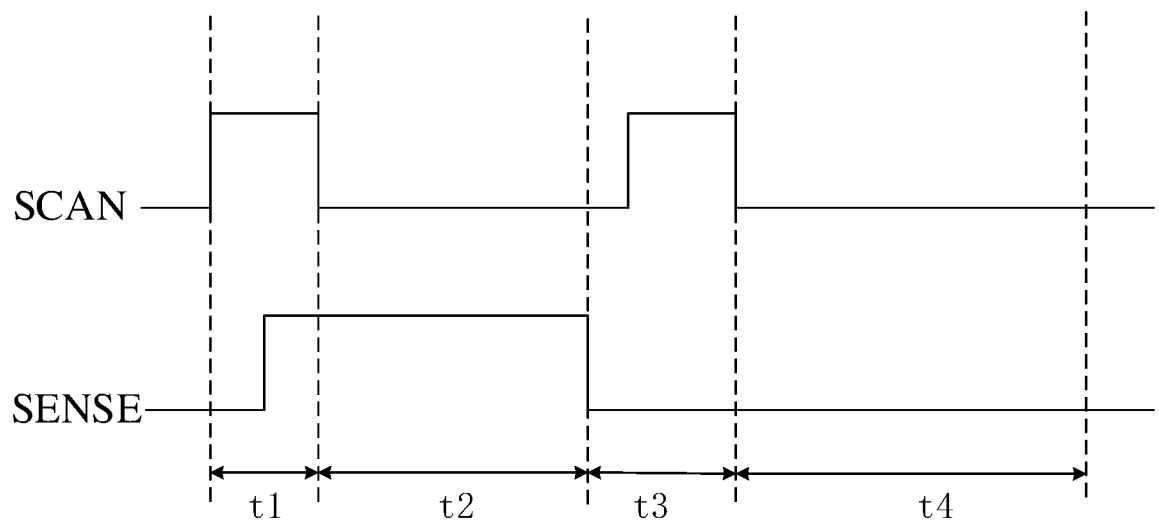
FIG. 4 is a timing diagram of signals applied on the driving circuit illustrated in FIGS. 2 and 3.

Please refer to FIG. 4 illustrating a timing diagram of signals applied on the driving circuit. The first scan signal SCAN and the second scan signal SENSE correspond to the reset phase t1, the threshold compensation phase t2, the writing phase t3 and the light-emitting phase t4. That is, within one frame time, the driving control sequence of the driving circuit includes a reset phase t1, a threshold compensation phase t2, a writing phase t3, and a light-emitting phase t4. It should be noted that the light-emitting device D emits light in the light-emitting stage t4.

Specifically, as shown in FIG. 2 and FIG. 4, in the reset phase t1, the first scan signal SCAN is at a high potential, and the second scan signal SENSE is at a low potential.

The first transistor T1 and the second transistor T2 are turned on in response to the high potential of the first scan signal SCAN. The fifth transistor T5 is turned on in response to the low potential of the second scan signal SENSE. At this time, potentials of the first node G and the third node S are reset to the power supply voltage of the first power supply terminal VDD through the first transistor T1 and the second transistor T2.

Subsequently, the second scan signal SENSE transitions to a high potential, and the first scan signal SCAN remains at the high potential.

The third transistor T3 and the fourth transistor T4 are turned on in response to the high potential of the second scan signal SENSE. The fifth transistor T5 is turned off in response to the high potential of the second scan signal SENSE. At this time, the second node P is reset through the third transistor T3 and the fourth transistor T4 based on the regulation voltage $V_{ref}$ provided by the second control signal VREF.

In the threshold compensation stage t2, the first scan signal SCAN is at the low potential, and the second scan signal SENSE is at the high potential.

The third transistor T3 and the fourth transistor T4 are turned on in response to the high potential of the second scan signal SENSE. In response to the regulation voltage $V_{ref}$ provided by the second control signal terminal VREF, the drain potential of the driving transistor T0 is raised or lowered until the current through the driving transistor T0 is zero. At this time, the potential value $V_{th}$ of the driving transistor T0 is stored on the second capacitor C2, namely:

$$V_{th}=V_{th0}-a*(V_{ref}-V_s)=0,$$

where $V_{th0}$ represents an initial potential of the driving transistor T0, $V_s$ represents the potential on the drain of the driving transistor T0 after the threshold compensation stage t2 ends, $V_{ref}$ represents the control voltage value, and a represents a parameter related to a film layer structure of the driving transistor T0.

In the writing phase t3, the first scan signal SCAN is at the high potential, and the second scan signal SENSE is at the low potential.

The first transistor T1 and the second transistor T2 are turned on in response to the high potential of the first scan signal SCAN. The fifth transistor T5 is turned on in response to the low potential of the second scan signal SENSE.

In the light-emitting period t4, the first scan signal SCAN is at the low potential, and the second scan signal SENSE is at the low potential.

The fifth transistor T5 is turned on in response to the low potential of the second scan signal SENSE. The driving transistor T0 is still turned on due to the potentials stored in the first capacitor C1 and the second capacitor C2. The light emitting device D emits light.

Figure 3:
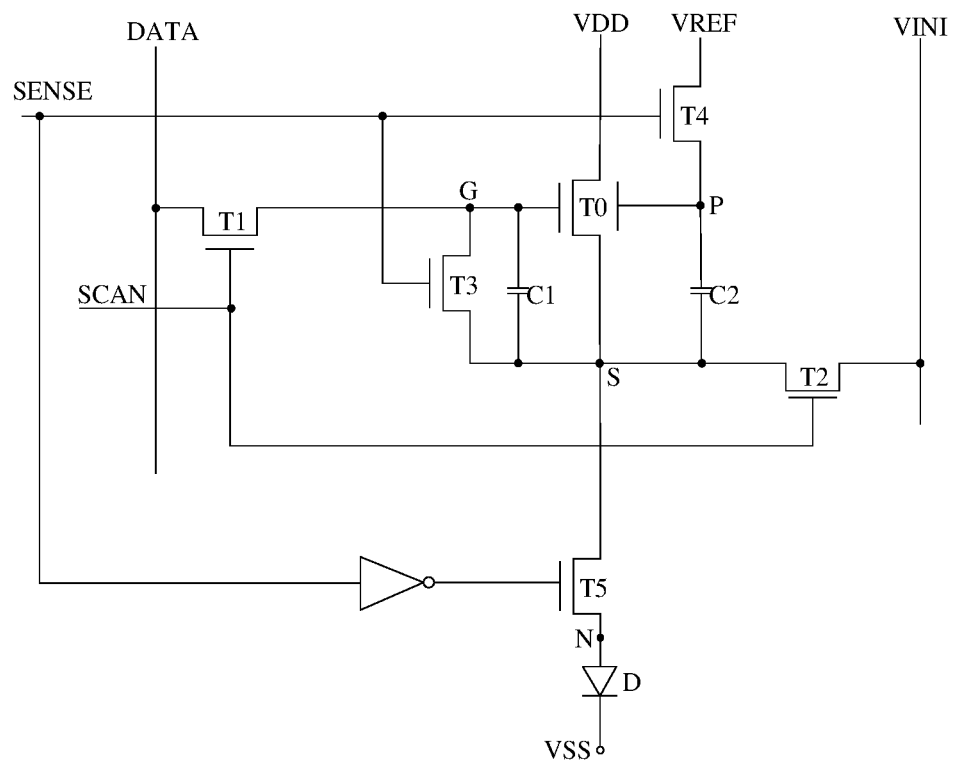
FIG. 3 is a circuit diagram of a driving circuit according to a second embodiment of the present disclosure.

Please refer to FIG. 3 illustrating a circuit diagram of the driving circuit according to the second embodiment of the present disclosure. As shown in FIG. 3, the lighting control module 103 further includes an inverter. An input terminal of the inverter is fed with the second scan signal SENSE, and an output terminal of the inverter is electrically connected to the gate of the fifth transistor T5.

The first gate of the driving transistor T0 is electrically connected to the first node G, and the second gate of the driving transistor T0 is electrically connected to the second node P. The source of the driving transistor T0 is electrically connected to the first power supply terminal VDD, and the drain of the driving transistor T0 is electrically connected to the third node S. The gate of the first transistor T1 is fed with the first scan signal SCAN. The source of the first transistor T1 is fed with the data signal DATA, and the drain of the first transistor T1 is electrically connected at the first node G. The gate of the second transistor T2 is fed with the first scan signal SCAN, the source of the second transistor T2 is fed with the first control signal VINI, and the drain of the second transistor T2 is connected to the third node S. The gate of the third transistor T3 is fed with the second scan signal SENSE, the source of the third transistor T3 is electrically connected to the first node G, and the drain of the third transistor T3 electrically connected to the third node S. The gate of the fourth transistor T4 is fed with the second scan signal SENSE, the source of the fourth transistor T4 is fed with the second control signal VREF, and the drain of the fourth transistor T4 is connected to the second node P. The first capacitor C1 is electrically connected between the first node G and the third node S. The second capacitor C2 is electrically connected between the second node P and the third node S. The gate of the fifth transistor T5 is fed with the second scan signal SENSE, the source of the fifth transistor T5 is electrically connected to the third node S, and the drain of the fifth transistor T5 is electrically connected to the fourth node N. The anode of the light-emitting device D is electrically connected to the fourth node N, and the cathode of the light-emitting device D is electrically connected to the second power supply terminal VSS.

The driving transistor T0, the first transistor T1, the second transistor T2, the third transistor T3, the fourth transistor T4 and the fifth transistor T5 are transistors of the same type. Specifically, the transistors in the driving circuit provided by the embodiments of the present disclosure are all P-type transistors or N-type transistors, which is beneficial to avoid differences between different types of transistors affecting the driving circuit. Preferably, the driving transistor T0, the first transistor T1, the second transistor T2, the third transistor T3, the fourth transistor T4 and the fifth transistor T5 are all N-type transistors. Since the inverter in this embodiment is provided with the same effect as the P-type transistor in the previous embodiment, the timing sequence of this embodiment is the same as that of the previous embodiment.

It should be noted that both the first power supply signal and the second power supply signal are used to output a preset voltage value. In addition, in the embodiment of the present disclosure, the potential of the first power supply signal is greater than the potential of the second power supply signal. Specifically, the potential of the second power supply signal may be but is not limited to the potential of the ground terminal.

It should be noted that the driving transistor T0, the first transistor T1, the second transistor T2, the third transistor T3, the fourth transistor T4, and the fifth transistor T5 may be low temperature polysilicon thin-film transistors, oxide semiconductor thin-film transistors, or amorphous silicon thin-film transistors. Preferably, the driving transistor T0, the first transistor T1, the second transistor T2, the third transistor T3, the fourth transistor T4, and the fifth transistor T5 are all low temperature polysilicon thin-film transistors.

Figure 5:
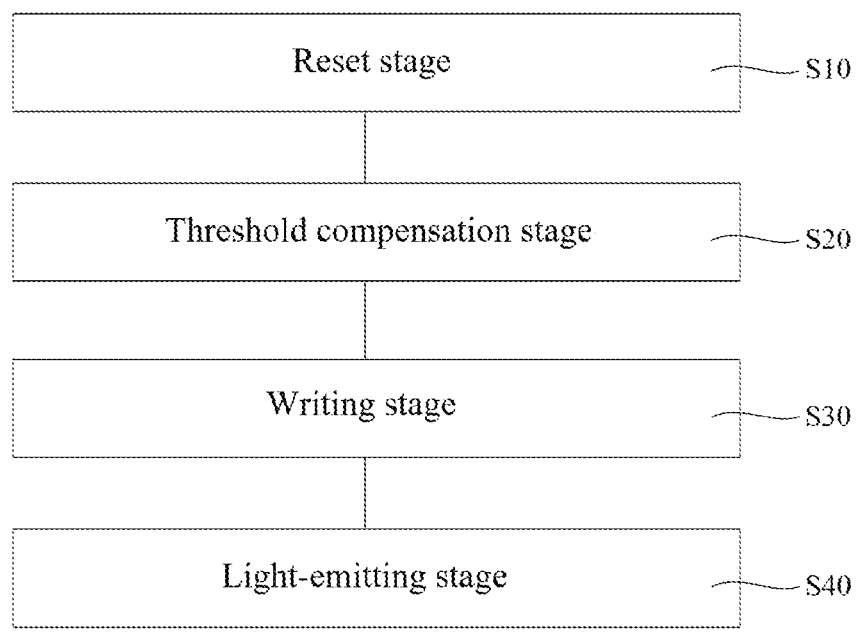
FIG. 5 is a flowchart of a driving method according to another embodiment of the present disclosure.

Please refer to FIG. 5 illustrating a flowchart of a driving method according to another embodiment of the present disclosure. The present disclosure also provides a driving method for the above-mentioned driving circuit. The driving method comprising:

At block S10, during a reset stage that the first transistor and the second transistor are turned on in response to the first scan signal, the fifth transistor is turned on in response to the second scan signal, the third transistor and the fourth transistor are turned on in response to the second scan signal, and the fifth transistor is turned off in response to the second scan signal, the data signal is transmitted to the first node, the first control signal is output to the third node, the second control signal is output to the second node, and potentials on the first node and the third node are kept at the same potential.

At block S20, during a threshold compensation stage that the third transistor and the fourth transistor are turned on in response to the second scan signal, the first transistor and the second transistor are turned off in response to the first scan signal, the fifth transistor is turned off in response to the second scan signal, keeping potentials on the first node and the third node to be the same, the third node is charged through the first power supply terminal until a voltage difference between the second node and the third node is equal to a threshold voltage of the driving transistor.

At block S30, during a writing stage that the first transistor and the second transistor are turned on in response to the first scan signal, the fifth transistor is turned on in response to the second scan signal, the data signal to the first node is output, and the first control signal is output to the third node.

At block S40, during a light-emitting stage, the light-emitting device emits light.

The reset stage S10 comprises a first reset stage and a second reset stage.

During the first reset phase that the first transistor and the second transistor are turned on in response to the first scan signal, the fifth transistor is turned on in response to the second scan signal, and the third transistor and the fourth transistor are turned off in response to the second scan signal, the data signal is transmitted to the first node, the first control signal is output to the third node, and the light-emitting device is reset.

During the second reset phase that the third transistor and the fourth transistor are turned on in response to the second scan signal, the fifth transistor is turned off in response to the second scan signal, and the first transistor and the second transistor are turned on in response to the first scan signal, the second control signal is output to the second node, potentials on the first node and the third node are kept at the same potential, and the first control signal is output to the third node.

Figure 6:
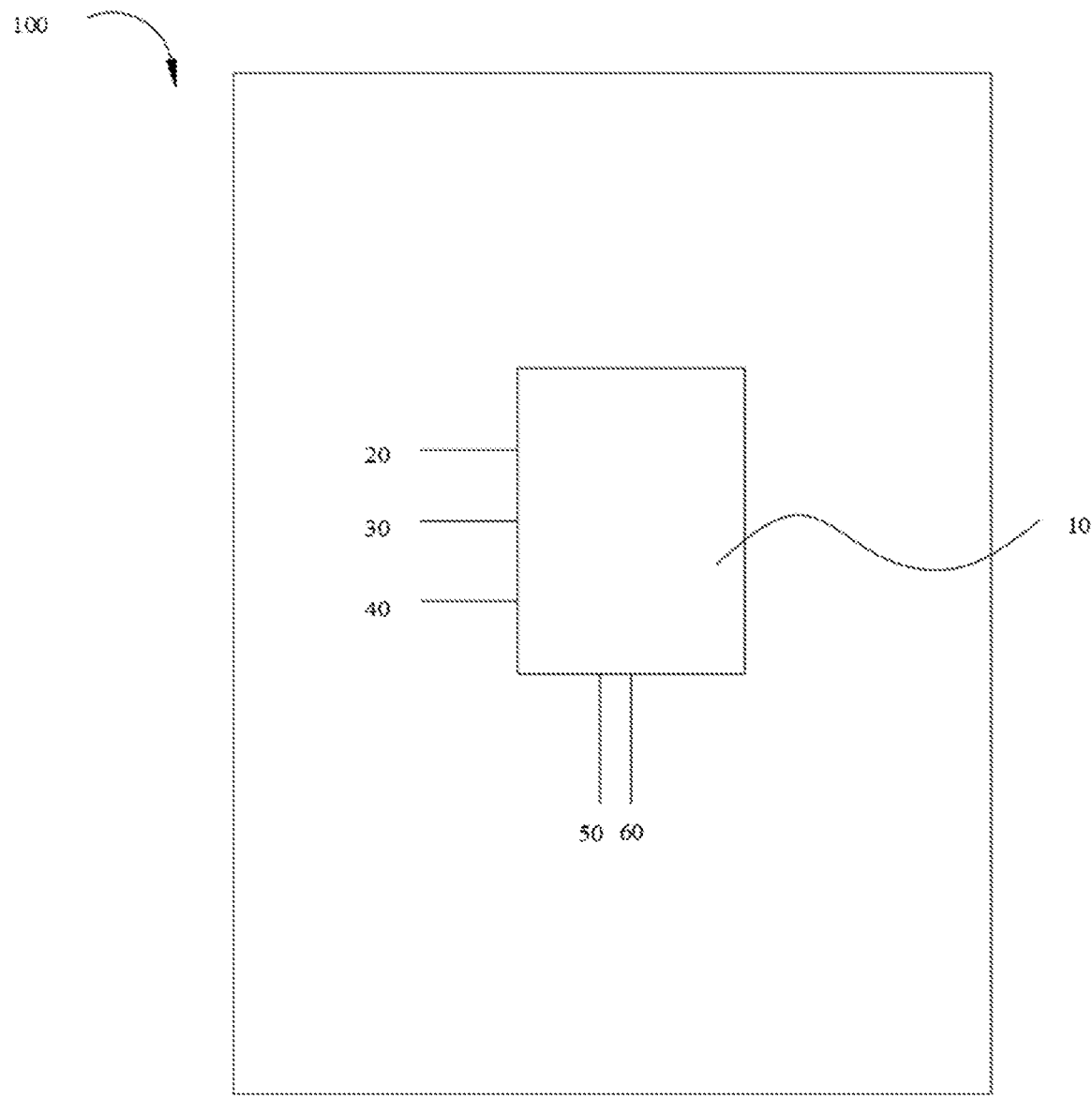
FIG. 6 is a schematic diagram of a backlight module according to another embodiment of the present disclosure.

Please refer to FIG. 6. illustrating a schematic diagram of a backlight module according to another embodiment of the present disclosure. This embodiment of the present disclosure is directed to a backlight module 100 which includes a data line 20, a first scan line 30, a second scan line 40, a first control signal line 50, a second control signal line 60, and the driving circuit 10. The data line 20 supplies the data signal DATA. The first scan line 30 supplies the first scan signal SCAN. The second scan line 40 is used supplies the second scan signal SENSE. The driving circuit 10 is connected to the data line 20, the first scan line 30, the second scan line 40, the first control signal line 50, and the second control signal line 60. The light-emitting device D may be Mini-LED or Micro-LED.

Figure 7:
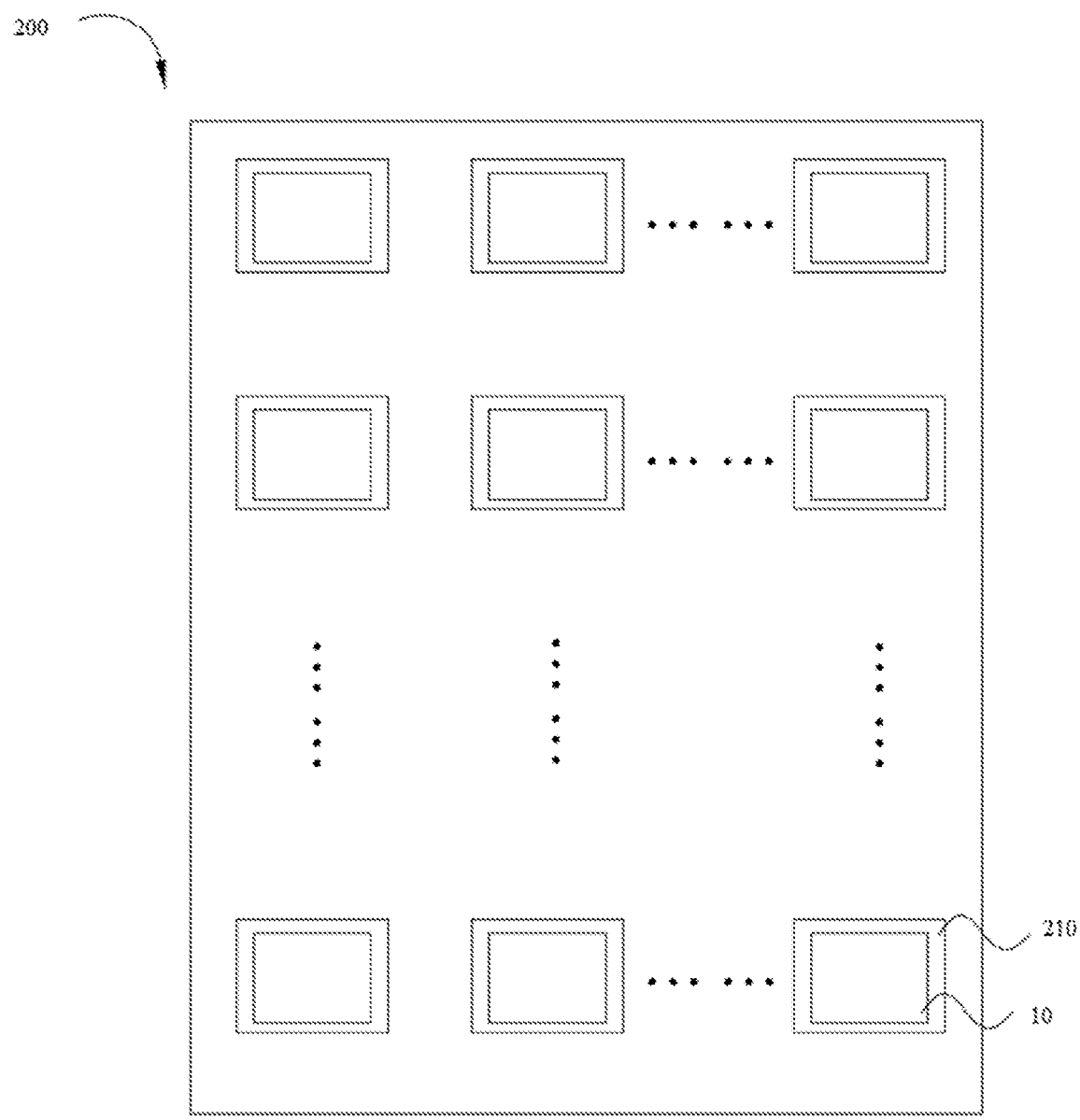
FIG. 7 is a schematic diagram of a display panel according to another embodiment of the present disclosure.

Please refer to FIG. 7 illustrating a schematic diagram of a display panel according to another embodiment of the present disclosure. This embodiment of the present disclosure is directed to a display panel 200 including a plurality of pixel units 210 arranged in an array. Each pixel unit 210 includes the driving circuit 10. The light-emitting device D can be Mini-LED or Micro-LED.

The display panel can be any product or component with display function, such as an electronic paper, a mobile phone, a tablet computer, a television, a monitor, a notebook computer, a digital photo frame, and a navigator.

The driving circuit, the driving method, and the display panel provided by the embodiments of the present disclosure include a light-emitting device D, a driving transistor T0, a writing module 101, a compensation module 102, and a light-emitting control module 103. The compensation module 102 can compensate the threshold voltage of the driving transistor T0 and reset the first node G, the second node P and the third node S, so that the threshold voltage of the driving transistor T0 can be compensated. It is beneficial to reduce the use of scan signal lines and improve the resolution of the display panel.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A driving circuit, comprising:
a driving transistor, having a first gate electrically connected to a first node, a second gate electrically connected to a second node, a source electrically connected to a first power supply terminal, and a drain electrically connected to a third node;
a writing module, fed with a data signal, a first control signal and a first scan signal, and electrically connected to the first node and the third node, configured to transmit the data signal to the first node in response to the first scan signal, and configured to transmit the first control signal to the third node in response to the first scan signal;
a compensation module, fed with a second control signal and a second scan signal, electrically connected to the first node, the second node and the third node, configured to reset the first node, the third node and the second node in response to the second control signal and the second scan signal, and configured to compensate a threshold voltage of the driving transistor in response to the second control signal and the second scan signal;
a light-emitting control module, fed with the second scan signal and electrically connected to the third node and the fourth node, configured to control the third node and the fourth node to be turned on or off in response to the second scan signal;
a light-emitting device, having an anode electrically connected to the fourth node, and a cathode electrically connected to the second power supply terminal.

2. The driving circuit as claimed in claim 1, wherein the writing module comprises:
a first transistor, having a gate fed with the first scan signal, a source fed with the data signal, and a drain electrically connected to the first node; and
a second transistor, having a gate fed with the first scan signal, a source fed with the first control signal, and a drain electrically connected to the third node.

3. The driving circuit as claimed in claim 1, wherein the compensation module comprises:
a third transistor, having a gate fed with the second scan signal, a source electrically connected to the first node, and a drain electrically connected to the third node;
a fourth transistor, having a gate fed with the second scan signal, a source fed with the second control signal, and a drain electrically connected to the second node;
a first capacitor, connected between the first node and the third node; and
a second capacitor, connected between the second node and to the third node.

4. The driving circuit as claimed in claim 3, wherein the lighting control module comprises: a fifth transistor, having a gate fed with the second scan signal, a source electrically connected to the third node, and a drain electrically connected to the fourth node.

5. The driving circuit as claimed in claim 4, wherein the driving transistor, the first transistor, the second transistor, the third transistor, and the fourth transistor are N-type transistors, and the fifth transistor is a P-type transistor.

6. The driving circuit as claimed in claim 4, wherein the lighting control module further comprises:
an inverter, having an input terminal fed with the second scan signal, and an output terminal electrically connected to the gate of the fifth transistor.

7. The driving circuit as claimed in claim 6, wherein the driving transistor, the first transistor, the second transistor, and the third transistor, the fourth transistor and the fifth transistor are transistors of the same type.

8. A driving method for driving a driving circuit, wherein the driving circuit comprises:
a light-emitting device, connected to a light circuit coupled to a first power supply terminal and a second power supply terminal;
a driving transistor, having a first gate electrically connected to a first node, a second gate electrically connected to a second node, a source electrically connected to the first power supply terminal, and a drain electrically connected to a third node;
a first transistor, having a gate fed with a first scan signal, a source fed with a data signal, and a drain electrically connected to the first node;
a second transistor, having a gate fed with a first scan signal, a source fed with a first control signal, and a drain electrically connected to the third node;
a third transistor, having a gate fed with a second scan signal, a source electrically connected to the first node, and a drain electrically connected to the third node;
a fourth transistor, having a gate fed with the second scan signal, a source fed with a second control signal, and a drain electrically connected to the second node;
a fifth transistor, having a gate fed with the second scan signal, a source electrically connected to the third node, and a drain electrically connected to a fourth node;
a first capacitor, connected between the first node and the third node; and
a second capacitor, connected between the second node and to the third node;
the driving method comprising:
during a reset stage that the first transistor and the second transistor are turned on in response to the first scan signal, the fifth transistor is turned on in response to the second scan signal, the third transistor and the fourth transistor are turned on in response to the second scan signal, and the fifth transistor is turned off in response to the second scan signal, transmitting the data signal to the first node, outputting the first control signal to the third node, outputting the second control signal to the second node, and keeping potentials on the first node and the third node to be the same;
during a threshold compensation stage that the third transistor and the fourth transistor are turned on in response to the second scan signal, the first transistor and the second transistor are turned off in response to the first scan signal, the fifth transistor is turned off in response to the second scan signal, keeping potentials on the first node and the third node to be the same, charging the third node through the first power supply terminal until a voltage difference between the second node and the third node is equal to a threshold voltage of the driving transistor;
during a writing stage that the first transistor and the second transistor are turned on in response to the first scan signal, the fifth transistor is turned on in response to the second scan signal, outputting the data signal to the first node, and outputting the first control signal to the third node; and
during a light-emitting stage, emitting light by the light-emitting device.

9. The driving method according to claim 8, wherein the reset stage comprises a first reset stage and a second reset stage;
during the first reset phase that the first transistor and the second transistor are turned on in response to the first scan signal, the fifth transistor is turned on in response to the second scan signal, and the third transistor and the fourth transistor are turned off in response to the second scan signal, transmitting the data signal to the first node, outputting the first control signal to the third node, and resetting the light-emitting device;

during the second reset phase that the third transistor and the fourth transistor are turned on in response to the second scan signal, the fifth transistor is turned off in response to the second scan signal, and the first transistor and the second transistor are turned on in response to the first scan signal, outputting the second control signal to the second node, keeping potentials on the first node and the third node to be the same, and outputting the first control signal to the third node.

10. A display panel, comprising a plurality of pixel units arranged in an array, each of the pixel units comprising a driving circuit, the driving circuit comprising:

a driving transistor, having a first gate electrically connected to a first node, a second gate electrically connected to a second node, a source electrically connected to a first power supply terminal, and a drain electrically connected to a third node;

a writing module, fed with a data signal, a first control signal and a first scan signal, and electrically connected to the first node and the third node, configured to transmit the data signal to the first node in response to the first scan signal, and configured to transmit the first control signal to the third node in response to the first scan signal;

a compensation module, fed with a second control signal and a second scan signal, electrically connected to the first node, the second node and the third node, configured to reset the first node, the third node and the second node in response to the second control signal and the second scan signal, and configured to compensate a threshold voltage of the driving transistor in response to the second control signal and the second scan signal;

a light-emitting control module, fed with the second scan signal and electrically connected to the third node and the fourth node, configured to control the third node and the fourth node to be turned on or off in response to the second scan signal; and a light-emitting device, having an anode electrically connected to the fourth node, and a cathode electrically connected to the second power supply terminal.

11. The display panel as claimed in claim 10, wherein the writing module comprises:

a first transistor, having a gate fed with the first scan signal, a source fed with the data signal, and a drain electrically connected to the first node; and a second transistor, having a gate fed with the first scan signal, a source fed with the first control signal, and a drain electrically connected to the third node.

12. The display panel as claimed in claim 10, wherein the compensation module comprises:

a third transistor, having a gate fed with the second scan signal, a source electrically connected to the first node, and a drain electrically connected to the third node;

a fourth transistor, having a gate fed with the second scan signal, a source fed with the second control signal, and a drain electrically connected to the second node;

a first capacitor, connected between the first node and the third node; and a second capacitor, connected between the second node and to the third node.

13. The display panel as claimed in claim 12, wherein the lighting control module comprises: a fifth transistor, having a gate fed with the second scan signal, a source electrically connected to the third node, and a drain electrically connected to the fourth node.

14. The display panel as claimed in claim 13, wherein the driving transistor, the first transistor, the second transistor, the third transistor, and the fourth transistor are N-type transistors, and the fifth transistor is a P-type transistor.

15. The display panel as claimed in claim 13, wherein the lighting control module further comprises:

an inverter, having an input terminal fed with the second scan signal, and an output terminal electrically connected to the gate of the fifth transistor.

16. The display panel as claimed in claim 15, wherein the driving transistor, the first transistor, the second transistor, and the third transistor, the fourth transistor and the fifth transistor are transistors of the same type.

* * * * *